Jan. 28, 1930. H. P. WILLIAMS 1,745,136
TRAILER COUPLER
Filed May 21, 1928
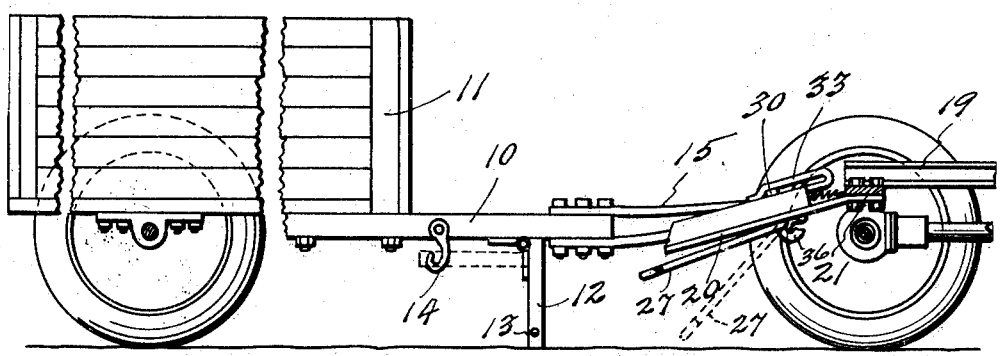
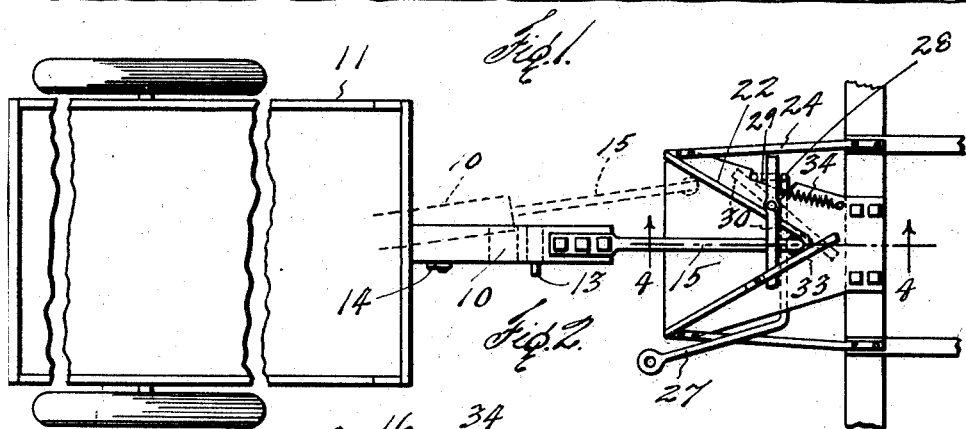
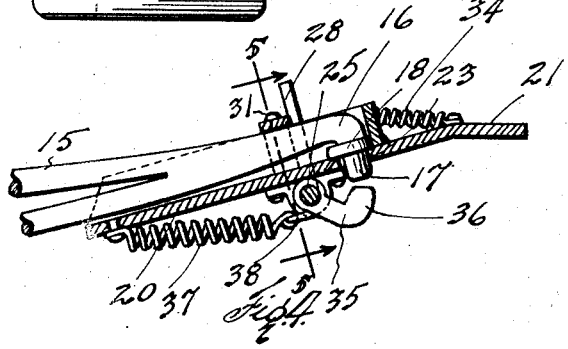
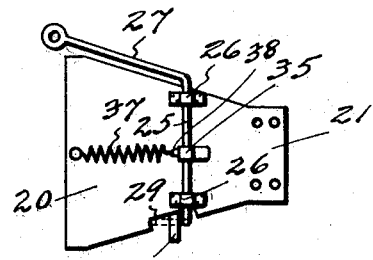
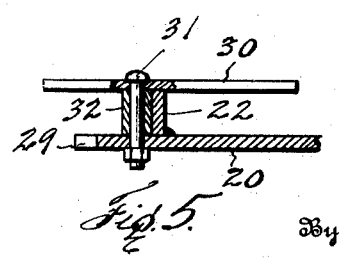
Inventor
H. P. Williams
By Jack A. Schley
Attorney Patented Jan. 28, 1930

1,745,136

UNITED STATES PATENT OFFICE

HUBERT P. WILLIAMS, OF HAMLIN, TEXAS

TRAILER COUPLER

Application filed May 21, 1928. Serial No. 279,358.

This invention relates to new and useful improvements in trailer couplers.

One object of the invention is to provide a coupler for use in connection with a trailer coupling, such as is shown in my Letters Patent No. 1,626,993, issued May 3, 1927.

A further object of the invention is to provide a coupler including means for fastening the trailer hook in place as well as means for dislodging the hook when it is desired to uncouple the trailer.

Another object of the invention is to provide a spring pressed latch operating in conjunction with a foot lever and an uncoupler, whereby the latch may be swung out of the way when the lever is operated either for coupling or uncoupling.

A particular object of the invention is to provide a kicker arm in connection with a foot lever and a spring latch, whereby the kicker arm is swung upwardly to dislodge the trailer hook at the same time the latch is displaced.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a view of portions of a trailer and a motor vehicle equipped with a coupler constructed in accordance with the invention, Fig. 2 is a plan view of the same, Fig. 3 is an underside view of the coupling plate.

Fig. 4 is an enlarged sectional view taken on the line 4—4 of Fig. 2, and

Fig. 5 is a transverse sectional view taken on the line 5—5 of Fig. 4.

In the drawings the numeral 10 designates the tongue of a trailer 11 of the two-wheel or cart type, although the invention may be applied to the four-wheel type. To the underside of the tongue I hinge a prop 12 provided near its lower end with a pin 13, so that when the prop is swung back and folded up against the bottom of the tongue it may be so held by engaging a hook 14 with said pin. The prop may, however, be hinged and fastened in any suitable manner.

On the front end of the tongue I fasten a bifurcated hook 15 having a down-turned bill 16 provided with a rounded nose 17 and a stop collar 18, such as is set forth in my former patent. However, the details of the hook are subject to variation. To the rear end of the motor vehicle 19 I fasten a coupling member including an inclined plate 20, a bracket 21, a guide 22 and an aperture or socket 23. The plate is flared outwardly and is inclined downwardly from the bracket. Braces 24, or other suitable fastenings, may be connected with the outer end of the plate for supporting it in position. The parts which have been described are similar to my former patent and the present invention relates to improvements thereto.

On the underside of the plate I mount a rock shaft 25 in hangers 26 fastened to said plate. A foot lever 27 is attached to one end of the shaft and extends along one side of the plate 20. On the other end of the shaft I provide an upstanding finger 28 which may be slightly curved, as is shown in Fig. 4, and which operates in a notch 29 in the edge of the plate 20, as is shown in Figs. 2 and 3. The shaft, lever and finger may be made in one piece and suitably bent to shape if desired, but could be made otherwise.

For pivoting a latch 30 I pass a bolt 31 through said latch and also through a sleeve 32 and the plate 20, whereby said sleeve is supported on the plate close to the guide 22 and the latch is mounted on said sleeve. The latch is in the form of a bar and has its shorter portion projecting into the path of the finger 28, while its longer portion extends across the upper end of the guide 22 and through a slotted keeper 33 on the opposite side of said guide. The latch normally extends transversely across the guide substantially parallel to the lower edge of the plate 20 and relatively lower on said plate than the socket 23, so that when the nose 17 of the hook 15 is in said socket the latch will lie across said hook, thus preventing its upward displacement from said socket. Such a coupling can not be detached unintentionally and makes for safety.

A coiled spring 34 has one end attached to the plate 20 while its other end is secured to the short arm of the latch 30 so that said spring normally holds the latch in its closed position and at the lower end of the keeper 33. When the operator presses the lever 27 downwardly, the finger 28 will also be swung downwardly, whereby the latch will be swung to the position shown in dotted lines in Fig. 2. With the latch in its upper or unlatched position, the hook 15 may be readily displaced upwardly and uncoupled from the plate 20. When the foot lever is returned to its normal position, the spring 34 will return the latch bar 30.

For displacing the nose 17 from the socket 23, a kicker arm 35 is fastened on the shaft 25 and this arm has an upturned end 36 located to strike the nose 17 and push the latter upwardly when said arm is swung by the shaft. A coiled spring 37 has one end fastened to the lower end of the plate 20 and its upper end secured to an eye 38 on the underside of the arm 35 below the shaft 25. This spring normally holds the arm in the position shown in Fig. 4, whereby the lever 27 and the finger 28 are supported in the position shown in full lines.

In making a coupling the tongue 10 is supported by the prop 12 as is shown in Fig. 1. The trailer may thus be loaded and left standing in the field or elsewhere. When it is desired to couple the trailer, the motor vehicle 23 is backed up so that the plate 20 is positioned under the bill 16 of the hook 15 and within the guide 22. This may be effected as is shown in dotted lines in Fig. 2, the width of the guide permitting considerable lateral variation. As the vehicle continues to back the nose 17 rides up the plate, thus lifting the prop 12 from the ground and this prop may be secured by the hook 14 after the coupling is made.

The nose 17 is guided toward the socket 23 and the bill 16 encounters the latch 30 and swings it upwardly until the nose 17 drops into the aperture, whereby the bill 16 is thus lowered and the spring 34 swings the latch back over said bill, thus securing the hook in place. When it is desired to uncouple the hook the operator depresses the lever 27 with his foot whereby the finger 28 swings the latch bar to the open position shown in dotted lines in Fig. 2. The depressing of the lever rocks the shaft 25 whereby the arm 35 is swung upwardly so that the upturned end of the arm 36 pushes the nose 17 upward and through the socket 23. While the lever is held in its depressed positon the trailer may be moved rearwardly or the motor vehicle slightly forward. With the nose resting on the plate 20 the prop 12 may be dropped and the motor vehicle then moved forwardly or the trailer may be shoved rearwardly and the prop permitted to rest upon the ground when the hook has been pulled far enough away from the plate 20. One man may couple the trailer and uncouple it and the entire device makes for safety, efficiency and convenience.

Various changes in the size and shape of the different parts, as well as modifications and alterations, may be made within the scope of the appended claims.

What I claim is:

1. In a trailer coupler, the combination of a hook having a down-turned bill and adapted to be connected to a trailer tongue, a coupling member having a guide provided with a socket for receiving said bill and adapted to be attached to a vehicle, a latch carried by the coupling member for holding the bill in the socket, a movable ejector for displacing said bill from said socket, and means mounted on the coupling member for releasing said latch and operating said ejector.

2. The combination defined by claim 1, and a spring for restoring said ejector to normal position, and a lever for operating said releasing means.

3. In a trailer coupler, the combination of a hook having a down-turned bill and adapted to be connected to a trailer tongue, a coupling member having an inclined guide provided with a socket for receiving said bill and adapted to be attached to the rear of a motor vehicle, a latch carried by the coupling member for holding the bill in the socket, a shaft mounted on the coupling member, a foot lever connected with said shaft, a finger mounted on the shaft for engaging the latch, a kicker arm mounted on the shaft for engaging and ejecting the bill of the hook, and a coiled spring connected with the kicker arm for returning the shaft to its normal position.

4. In a trailer coupler, the combination of a hook having a down-turned bill adapted to be connected to a trailer tongue, a coupling member having an inclined guide provided with a socket for receiving said bill and adapted to be attached to the rear of a motor vehicle, a latch carried by the coupling member for holding the bill in the socket, means mounted on the coupling member for displacing the latch and ejecting the bill from the socket, the latch being pivoted for movement independently of the operating means, and a coiled spring attached to said latch for returning it to its normal position after it has been displaced by the bill of the hook in effecting a coupling.

5. In a trailer coupler, an inclined coupling plate having a converging guide with a socket at its upper end, a spring-head latch pivotally mounted on the plate and overhanging the guide to swing parallel to the plate and toward and from said socket, a keeper engaged by the free end of the latch, a rock shaft mounted on the plate and having a projection for engaging the latch, and a foot lever attached to one end of the shaft.

In testimony whereof I affix my signature.

HUBERT P. WILLIAMS.